United States Patent
Tümler et al.

(10) Patent No.: US 12,025,460 B2
(45) Date of Patent: Jul. 2, 2024

(54) CONCEPT FOR THE CONTROL OF A DISPLAY OF A MOBILE AUGMENTED REALITY DEVICE

(71) Applicant: Volkswagen Aktiengesellschaft, Wolfsburg (DE)

(72) Inventors: Johannes Tümler, Wellen (DE); Adrian Haar, Hannover (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 576 days.

(21) Appl. No.: 15/734,024

(22) PCT Filed: May 9, 2019

(86) PCT No.: PCT/EP2019/061983
§ 371 (c)(1),
(2) Date: Dec. 1, 2020

(87) PCT Pub. No.: WO2019/228780
PCT Pub. Date: Dec. 5, 2019

(65) Prior Publication Data
US 2021/0231451 A1    Jul. 29, 2021

(30) Foreign Application Priority Data
Jun. 1, 2018    (DE) ............ 10 2018 208 700.8

(51) Int. Cl.
*G01C 21/36* (2006.01)
*G02B 27/01* (2006.01)
*G06T 19/00* (2011.01)

(52) U.S. Cl.
CPC ....... *G01C 21/365* (2013.01); *G01C 21/3602* (2013.01); *G01C 21/3632* (2013.01); *G02B 27/017* (2013.01); *G06T 19/006* (2013.01)

(58) Field of Classification Search
CPC .............. G01C 21/365; G01C 21/3602; G01C 21/3632; G01C 21/20; G02B 27/017;
(Continued)

(56) References Cited

U.S. PATENT DOCUMENTS 9,304,003 B1    4/2016  Ashman et al.
9,395,875 B2 *  7/2016  Geraci ............... G06Q 30/0261
(Continued)

FOREIGN PATENT DOCUMENTS

CN    102612709 A    7/2012  ............. G08G 1/096
CN    104838235 A    8/2015  ............. G01C 21/20
(Continued)

OTHER PUBLICATIONS

Gabbard, Joseph L. et al., "Behind the Glass: Driver Challenges and Opportunities for AR Automotive Applications," Proceedings of IEEE, vol. 102, No. 2, pp. 124-136, Feb. 1, 2014.
(Continued)

*Primary Examiner* — Rodney A Butler
(74) *Attorney, Agent, or Firm* — Slayden Grubert Beard PLLC (57) ABSTRACT

The invention relates to a method, a device and a computer-readable storage medium with instructions for controlling a display of a mobile augmented reality device of a user. First a static navigation display for a destination is generated, which is positioned in a stationary manner in a real environment. If a situation is detected that requires an adaptation of the display of the mobile augmented reality device, a static navigation display adapted to the situation or a supplementary navigation display is generated.

18 Claims, 6 Drawing Sheets

(58) Field of Classification Search
CPC ...... G02B 2027/0138; G02B 2027/014; G02B 2027/0178; G06T 19/006; G06F 3/011
See application file for complete search history.

(56) References Cited

U.S. PATENT DOCUMENTS

| | | | |
|---|---|---|---|
| 9,625,270 | B2 | 4/2017 | Cho et al. |
| 9,983,018 | B2 | 5/2018 | Ko |
| 10,751,609 | B2* | 8/2020 | Vandonkelaar ....... A63F 13/213 |
| 2004/0036675 | A1* | 2/2004 | Kajitsuka ............ G06T 19/003 345/156 |
| 2007/0106433 | A1 | 5/2007 | He ................................. 701/16 |
| 2012/0158301 | A1 | 6/2012 | Schilling et al. ............ 701/533 |
| 2013/0141565 | A1 | 6/2013 | Ling .......................... 348/135 |
| 2014/0114564 | A1 | 4/2014 | Callaghan et al. ........... 701/416 |
| 2014/0266989 | A1* | 9/2014 | Takahashi .......... G02B 27/0093 345/8 |
| 2014/0267400 | A1 | 9/2014 | Mabbutt et al. ............. 345/633 |
| 2015/0153182 | A1* | 6/2015 | Tu ...................... G06F 3/04847 715/771 |
| 2015/0356787 | A1 | 12/2015 | Abe et al. .................... 345/633 |
| 2016/0140868 | A1 | 5/2016 | Lovett et al. ................ 434/118 |
| 2017/0193705 | A1 | 7/2017 | Mullins et al. |
| 2017/0243319 | A1* | 8/2017 | Wittenbrink ............ G06T 15/00 |
| 2017/0343375 | A1 | 11/2017 | Kamhi et al. |
| 2018/0080774 | A1 | 3/2018 | Sink et al. |

FOREIGN PATENT DOCUMENTS

| | | | | |
|---|---|---|---|---|
| CN | 106895839 A | 6/2017 | ............. | G01C 21/00 |
| DE | 102014219575 A1 | 7/2015 | ............. | B60R 16/02 |
| DE | 102017111843 A1 | 11/2017 | ............. | G01C 21/34 |
| DE | 102018208700 A1 | 12/2019 | ............. | G01C 21/04 |
| EP | 2448238 A1 | 5/2012 | ............. | G06F 17/30 |
| EP | 2960630 A2 | 12/2015 | ............. | G01C 21/36 |
| WO | 2017/195034 A1 | 11/2017 | ............. | G06G 1/16 |
| WO | 2018/048913 A1 | 3/2018 | ............. | G08B 25/01 |
| WO | 2019/228780 A1 | 12/2019 | ............. | G01C 21/20 |

OTHER PUBLICATIONS

Lee, Jeong-Woo et al., "Development of Lane-Level Guidance Service In Vehicle Augmented Reality System," 17th International Conference on Advanced Communication Technology (ICACT), p. 263-266, Jul. 1, 2015.
German Office Action, Application No. 10 2018 208 700.8, 5 pages, Jan. 3, 2019.
International Search Report and Written Opinion, Application No. PCT/EP2019/061983, 20 pages, Aug. 9, 2019.

* cited by examiner

CONCEPT FOR THE CONTROL OF A DISPLAY OF A MOBILE AUGMENTED REALITY DEVICE

CROSS-REFERENCE TO RELATED APPLICATIONS

This application claims priority to German Patent Application No. 10 2018 208 700.8, filed on Jun. 1, 2018 with the German Patent and Trademark Office. The contents of the aforesaid Patent Application are incorporated herein for all purposes.

TECHNICAL FIELD

The present invention relates to a method, a device and a computer-readable storage medium with instructions for controlling a display of a mobile augmented reality device of a user. The invention furthermore relates to a mobile augmented reality device in which a method according to the invention, or device according to the invention, is used.

BACKGROUND

This background section is provided for the purpose of generally describing the context of the disclosure. Work of the presently named inventor (s), to the extent the work is described in this background section, as well as aspects of the description that may not otherwise qualify as prior art at the time of filing, are neither expressly nor impliedly admitted as prior art against the present disclosure.

For years, an increasing dissemination of digital technologies within society has been discernible. It is to be anticipated that this digitization of society in day-to-day life will significantly increase. Virtual and augmented reality technologies and applications are one particular expression of digitization. Augmented reality (AR) involves the enrichment of the real world by virtual elements that are recorded at the correct location in three-dimensional space and permit real-time interaction. Since the expression "augmented reality" has won out over "erweiterte Realität" among professionals of the German speaking world, the former will be used in the following. The expression "mixed reality" will also be used as a synonym. Augmented reality glasses can for example be used to show AR displays. Augmented reality glasses are worn like normal glasses but they have one or more projection units or displays with the assistance of which information can be projected in front of the eyes or directly on the cornea of the wearer of the glasses. The glasses are designed so that the wearer can also perceive the environment. New technologies for augmented reality glasses such as light field technology, advancements in the employed battery technology as well as the involvement of large corporations in the above suggests an increasing acceptance of these devices.

Alternatively, AR displays can also be generated using augmented reality smartphones or augmented reality tablets. In doing so, virtual elements are displayed on the display of the particular device together with the environment recorded by the camera of the particular device. A projection of content into the real environment is also possible.

Overall, it is foreseeable that augmented reality glasses, augmented reality smartphones and other augmented reality devices will be used to an increasing extent by end users. An essential application for portable augmented reality systems is navigation both inside means of transportation and outside of means of transportation. Navigation instructions can be output by simple movement instructions, for example in the form of directional arrows or instruction texts.

In particular with pedestrian navigation, it cannot be assumed that persons will walk precisely on the path suggested by the navigation system and displayed by the augmented reality device. It may happen that the user deviates enough from a static navigation path with a fixed location in the world that the path at some point is no longer discernible given the distance. Consequently, an adaptation of the path to the spatial position and orientation of the user is recommendable.

An augmented reality display is distinguished in that it is interactive, i.e., that the displayed picture has a minimum image refresh rate. Normally about 60 images per second are generated. For each individual image, the position and orientation of the user recorded at the moment is used to generate the augmented reality display. One essential feature of an augmented reality navigation display is that the user intuitively understands the message, but the augmented reality display is not perceived as overbearing, but rather as harmoniously embedded in the environment. It is therefore not a solution to have the navigation path for each calculated individual picture start from the current camera perspective of the observer. The user would be irritated and distracted by the continuously and very rapidly changing path; the navigation path would therefore not be perceived as an object harmoniously integrated in the environment.

SUMMARY

An object exists to provide an improved control of the display of a mobile augmented reality device.

The object is achieved by a method, by a device, and by a mobile augmented reality device having the features of the respective independent claim. Embodiments of the invention are discussed in the dependent claims and the following description.

The details of one or more embodiments are set forth in the accompanying drawings and the description below. Other features will be apparent from the description, drawings, and from the claims.

DESCRIPTION

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a first exemplary aspect, a method for controlling a display of a mobile augmented reality device of a user comprises the steps:
- generating a static navigation display for a destination that is fixedly positioned in a real environment;
- detecting a situation that requires an adaptation of the display of the mobile augmented reality device; and
- generating a static navigation display adapted to the situation, or a supplementary navigation display.

Correspondingly and in a second exemplary aspect, a computer-readable storage medium receives instructions that, while being executed by a computer, allow the computer to execute the following steps to control a display of a mobile augmented reality device of a user:
- generating a static navigation display for a destination that is fixedly positioned in a real environment;
- detecting a situation that requires an adaptation of the display of the mobile augmented reality device; and
- generating a static navigation display adapted to the situation, or a supplementary navigation display.

The term "computer" is to be interpreted broadly. For example, it also comprises work stations, distributed systems, and other processor-based data processing devices.

Analogously and in another exemplary aspect, a device for controlling a display of a mobile augmented reality device of a user has:
- a graphics generator for the generation of a static navigation display for a destination that is fixedly positioned in a real environment; and
- a sensor system for detecting a situation that requires an adaptation of the display of the mobile augmented reality device; wherein the graphics generator is configured to generate a static navigation display adapted to the situation, or a supplementary navigation display.

Some embodiments are based on the idea of not continuously re-creating and inserting the static stationary navigation display fixedly positioned in the real environment but rather continuously checking whether an adaptation of the display is necessary and generating an adapted display depending on the results. In this manner, the navigation display is recorded in the real world in a spatially fixed manner, or respectively fixedly positioned in the world; nonetheless, the user has the option of free movement, including away from the displayed path. If during this free movement, a situation arises that an adaptation of the display is needed, for example because the user is too far distant from the displayed path, an adapted static navigation display or a supplementary navigation display is finally generated and displayed. The situational adaptation of the display prevents the displayed path from changing continuously and very rapidly.

In some embodiments, the situation that requires an adaptation of the display of the mobile augmented reality device is recorded on the basis of user input. The user input may for example consist of the user performing a specific facial or hand gesture or issuing a voice command. For example, the adaptation can occur when the user looks at his feet for a certain time period. By means of user input, it can be very easily determined when an adaptation of the display should be made so that an involved computational evaluation may be unnecessary. At the same time, this solution has the benefit that the user independently determines when he desires an adaptation of the display, i.e., the user is not confronted with adaptations that may be unnecessary for him.

In some embodiments, the supplementary navigation display is a temporary navigation path toward the destination, a compass, or a directional arrow. This approach is especially beneficial when the navigation information is only displayed situationally instead of a path. By means of the situational information, the display of unnecessary information is avoided; at the same time, a continuous adaptation of the path is also unnecessary. For example, turns from a curved path can be indicated only at the relevant corner or curve. If the user loses orientation, the user may have a temporary path appear through user input. This illustrates the traveled path to the next navigation situation but is hidden again after a certain time. Instead of a temporary path, a type of compass may be inserted that points in the direction of the next navigation situation.

In some embodiments, the supplementary navigation display is a visual signal with a directional characteristic. This solution has the benefit that the directional information conveyed by means of the directional characteristic is intuitively detected by the user. For example, a brief flashing of the screen on one or both eyes or a screen segment may occur by which the necessary turning direction or walking direction is communicated. This flashing may communicate relatively general directional information, for example, only a differentiation between left and right. It may also be positioned more precisely in order to create more exact directional information up to a type of stereo flash for both eyes that appears spatially positioned.

In some embodiments, an area that can be augmented by the augmented reality device is divided into subareas in the real environment, wherein the static navigation display is a navigation path proceeding from a first subarea in the direction of the destination. It is then detected that the user is switching from a first subarea to a second subarea. Then the navigation path proceeding from the first subarea is hidden, and a navigation path proceeding from the second subarea is inserted. In this solution, the augmentable area is divided into sections, or respectively subareas of a fixed size, so-called tiles. A navigation path is then displayed that is static and fixedly connected to the environment, i.e., the starting point and end point are fixed. If the observer leaves one tile and enters the next one, the current navigation path is hidden. This may be done without or with animation; for example, the current navigation path may become increasingly transparent. While the navigation path proceeding from the old tile disappears, the navigation path for the new tile is calculated and inserted. In doing so, it is recommendable if no two equivalent paths are visible at the same time to prevent confusion. The old navigation path is first largely hidden before the new navigation path is shown. A benefit of this approach is that the user cannot get far enough away from the navigation path for problems with recognizability to occur, but at the same time there is also no continuous, annoying adaptation of the path.

In some embodiments, the navigation path is only hidden between the first subarea and an intermediate destination and is inserted between the second subarea and the intermediate destination. This solution reduces the adaptation of the navigation path to a comparatively small section since the path between the intermediate destination and the destination is retained. In this manner, the adaptation of the path for the user is less apparent and therefore less annoying.

The method according to the teachings herein or a device according to the teachings herein may in some embodiments be used in a mobile augmented reality device, for example in augmented reality glasses, in an augmented reality smartphone, or in an augmented reality tablet.

Further features of the present disclosure will become apparent from the following description and the appended claims in conjunction with the FIGS.

In order to better understand the principles of the present disclosure, embodiments are explained in greater detail below based on the FIGS. It should be understood that the invention is not limited to these embodiments and that the features described may also be combined or modified without departing from the scope of the invention as defined in the appended claims.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

Figure 1:
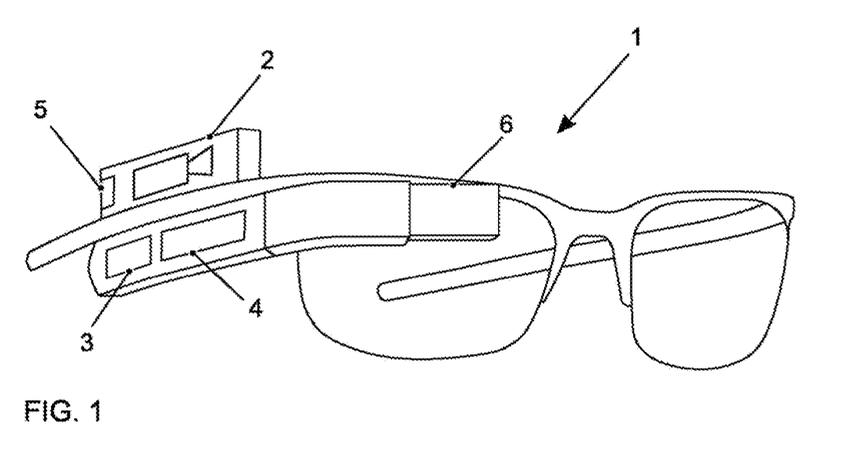
FIG. 1 schematically portrays an embodiment of augmented reality glasses.

FIG. 1 schematically portrays augmented reality glasses as an example of a mobile augmented reality device 1. The augmented reality glasses 1 have a camera 2 for recording environmental data of an environment of the augmented reality glasses 1. By means of a pose-determining device 3, a pose of the augmented reality glasses 1 can be determined, for example using the environmental data. A graphics unit 4 generates a display for the augmented reality glasses 1 corresponding to the ascertained pose. To accomplish this, the pose-determining device 3 and the graphics unit 4 can exchange data with each other. The pose-determining device 3 and the graphics unit 4 may be part of the augmented reality glasses 1 as shown in the example. However, they can also be connected as external devices via an interface 5 to the augmented reality glasses 1. The display generated by the graphics unit 4 is shown by a projection unit 6. In the example in FIG. 1, a monocular display is used, i.e., a display is only arranged before one eye of the user. The solution currently being described may of course also be realized with augmented reality glasses 1 with a binocular display in which one display per eye is used, or with a binocular display in which a common display is used for both eyes.

Figure 2:
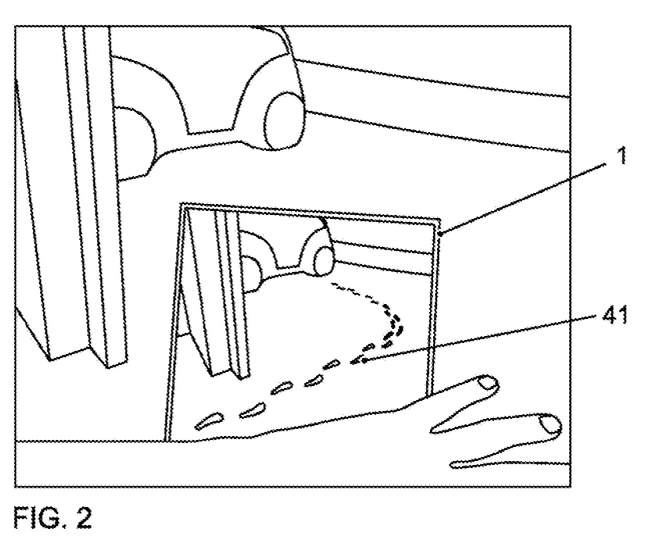
FIG. 2 schematically portrays an embodiment of a static navigation path fixedly located in the world on a mobile augmented reality device.

FIG. 2 schematically portrays a static navigation path 41 fixedly located in the world on a mobile augmented reality device 1. In this example, the augmented reality device 1 is a tablet. The environment recorded by a camera of the tablet is displayed on the display. A navigation path 41 that is shown in the form of stylized footprints is superimposed on this environment. Since the user is located in the direct vicinity of the navigation path 41, the footprints are readily discernible.

Figure 3:
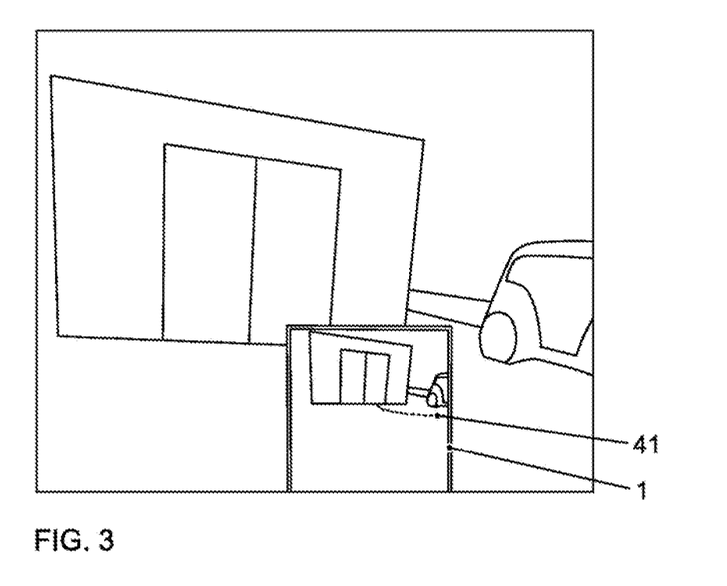
FIG. 3 portrays the static navigation path fixedly located in the world with a great distance of the user from the navigation path.

FIG. 3 portrays the static navigation path 41 fixedly located in the world with a greater distance of the user from the navigation path 41. As above, the augmented reality device 1 is a tablet, on the display of which the environment recorded by the camera of the tablet is displayed. In this case as well, a navigation path 41 is displayed in the form of stylized footprints. Given the great distance of the user from the navigation path 41, it is scarcely discernible on the display, however.

Figure 4:
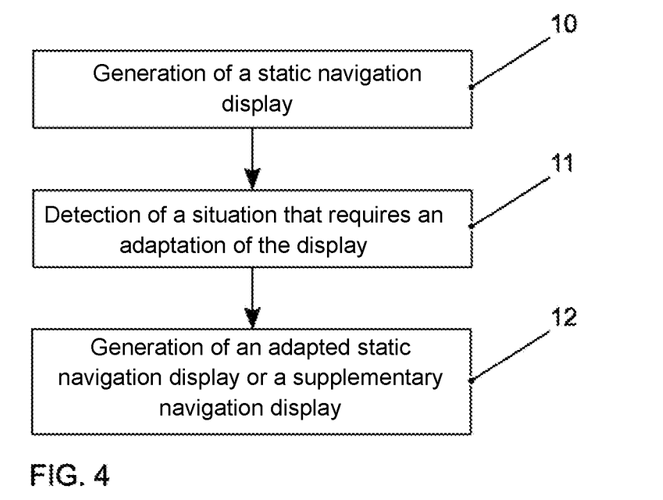
FIG. 4 schematically portrays an embodiment of a method for controlling a display of a mobile augmented reality device of a user.

FIG. 4 schematically portrays a method for controlling a display of a mobile augmented reality device of a user. First, a static navigation display is generated for a destination 10 that is fixedly positioned in a real environment. If a situation is detected 11 that requires an adaptation of the display of the mobile augmented reality device, a static navigation display adapted to the situation or a supplementary navigation display is generated 12. The situation that requires an adaptation of the display of the mobile augmented reality device can be recorded on the basis of user input. The user input may for example consist of the user performing a specific facial or hand gesture or issuing a voice command. The supplementary navigation display may for example be a temporary navigation path in the direction of the destination, a compass, a directional arrow or a visual signal with a directional characteristic.

Figure 5:
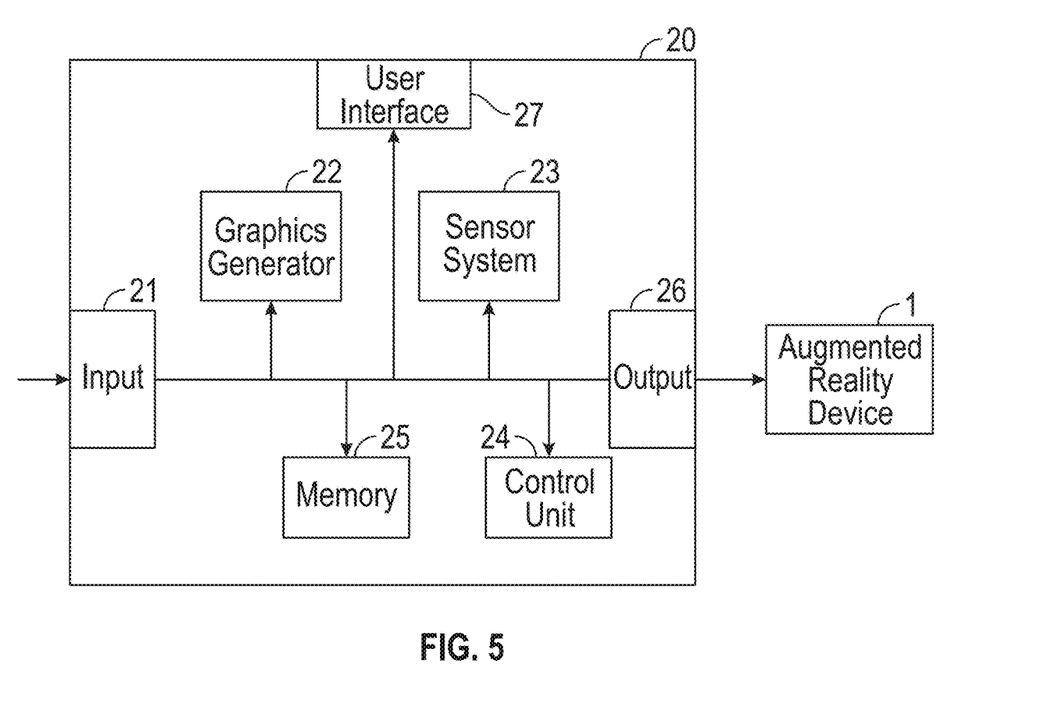
FIG. 5 schematically portrays a first embodiment of a device for controlling a display of a mobile augmented reality device of a user.

FIG. 5 schematically portrays a first embodiment of a device 20 for controlling a display of a mobile augmented reality device 1 of a user. The device 20 has an input 21 through which for example data on a position and a viewing direction of a user of the augmented reality device 1 may be received. The device 20 moreover has a graphics generator 22 for the generation of a static navigation display for a destination that is fixedly positioned in a real environment. By means of a sensor system 23, a situation may be detected that requires an adaptation of the display of the mobile augmented reality device 1. The situation that requires an adaptation of the display of the mobile augmented reality device can be recorded by the sensor system 23, for example on the basis of user input. The user input may for example consist of the user performing a specific facial or hand gesture or issuing a voice command. If the sensor system 23 detects a situation that requires an adaptation of the display of the mobile augmented reality device 1, the graphics generator 22 generates a static navigation display or supplementary navigation display adapted to the situation. The supplementary navigation display may for example be a temporary navigation path in the direction of the destination, a compass, directional arrow or visual signal a with directional characteristic. The adapted static navigation display or the supplementary navigation display is output via an output 26 of the device 20 to the augmented reality device 1.

The graphics generator 22 and the sensor system 23 may be controlled by a control unit 24. If necessary, settings of the graphics generator 22, the sensor system 23 or the control unit 24 can be changed by means of a user interface 27. The data accumulating in the device 20 can be filed in a memory 25 of the device 20 if required, for example for later evaluation or for use by the components of the device 20. The graphics generator 22, the sensor system 23 as well as the control unit 24 can be realized as dedicated hardware, for example as integrated circuits. Of course, they may, however, also be partially or completely combined or implemented as software that runs on a suitable processor, such as a GPU or CPU. The input 21 and output 26 can be implemented as separate interfaces or as a combined bidirectional interface. In the described example, the device 20 is an independent component. It may also be integrated in the augmented reality display device 1 or in a computing unit for controlling the augmented reality display device 1.

Figure 6:
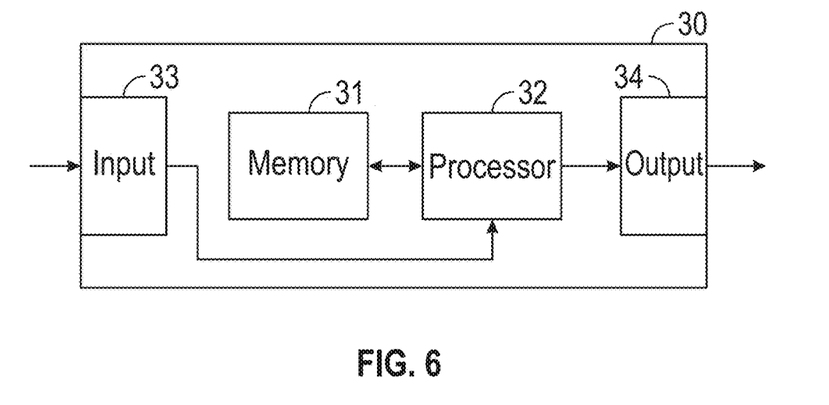
FIG. 6 schematically portrays a second embodiment of a device for controlling a display of a mobile augmented reality device of a user.

FIG. 6 schematically portrays a second embodiment of a device 30 for controlling a display of a mobile augmented reality device of a user. The device 30 comprises a processor 32 and a memory 31. For example, the device 30 is a computer or a mobile computing unit such as a tablet or a smartphone. Instructions are saved in the memory 31 that, when executed by the processor 32, cause the device 30 to execute the steps according to one of the described methods. The instructions saved in the memory 31 thus represent a program that can be run by the processor 32 and that is realized by the method according to the present embodiment. The device 30 has an input 33 for receiving information. Data generated by the processor 32 is made available via an output 34. Moreover, said data can be saved in the memory 31. The input 33 and the output 34 can be combined into a bidirectional interface.

The processor 32 may comprise one or more processor units, for example microprocessors, digital signal processors or combinations thereof.

The memories 25, 31 of the described embodiments may have volatile as well as non-volatile memory sections and may comprise a wide range of memory units and storage media, such as hard disks, optical storage media or semiconductor memories.

Figure 7:
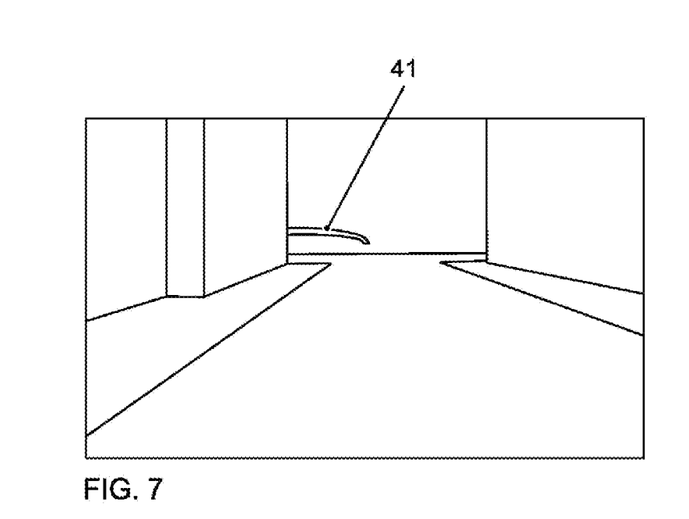
FIG. 7 portrays a situational display of navigation information with the example of a turnoff path.

FIG. 7 portrays a situational display of navigation information with the example of a turnoff path. In this example, the static navigation display 41 does not consist of a path, but rather only situational navigation information, in this case a curved turnoff path at the relevant corner, or respectively curve. This prevents the display of unnecessary information. If the user loses orientation, the user can have a temporary path appear through user input as a supplementary navigation display. This illustrates the traveled path to the next navigation situation but disappears again after a certain time. The temporarily displayed navigation path may for example briefly appear entirely in the form of fragmented displays. It may alternatively be displayed in the form of a suggested wave running away from the viewer in the direction of the next navigation point. The wave may be parameterized by the speed, size, position and number of simultaneously shown fragments.

Figure 8:
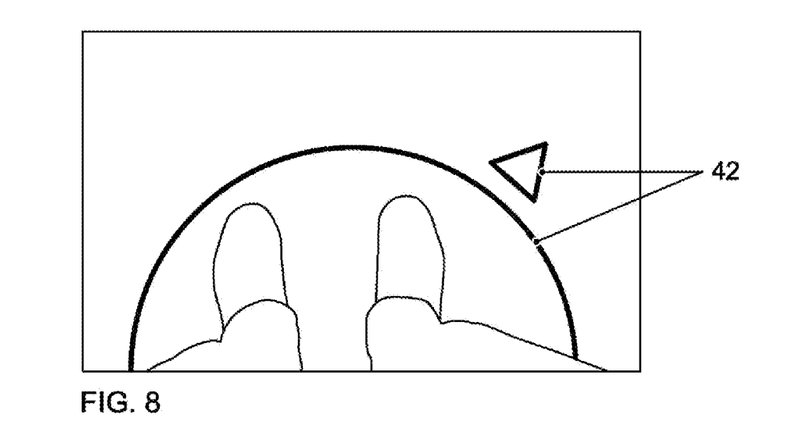
FIG. 8 portrays a display of a supplementary navigation display with the example of a compass.

FIG. 8 portrays a display of a supplementary navigation display 42 with the example of a compass. On the basis of a user input, a supplementary navigation display 42 is inserted, in this example a compass, that is at the feet of the user and points in the direction of the next navigation situation. For this type of supplementary navigation display 42, it is recommendable if the user input consists of the user looking at his feet for a certain period of time. The supplementary navigation display 42 can also be hidden again once the user averts his gaze from his feet.

Figure 9:
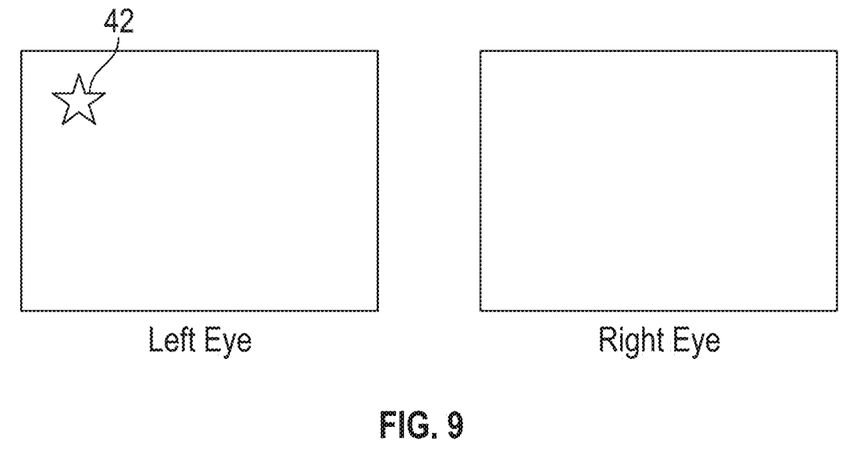
FIG. 9 portrays a display of a supplementary navigation display with the example of a visual instruction.

FIG. 9 portrays a display of a supplementary navigation display 42 with the example of a visual instruction. On the left, the display is shown for the left eye of the user, on the right, the display for the right eye. The required turning direction or walking direction is communicated by a short flashing of the screen on one or both eyes or a short screen segment indicated by the shown star. The flashing may for example be in the form of a light signal that is displayed for a few milliseconds, or respectively a few frames. The flashing can communicate relatively general directional information, for example, only a differentiation between left and right. A turn to the left is communicated in the example in FIG. 9. The visual instruction can however also be more precisely positioned in order to provide more precise directional information up to a spatially positioned visual instruction for both eyes.

Figure 10:
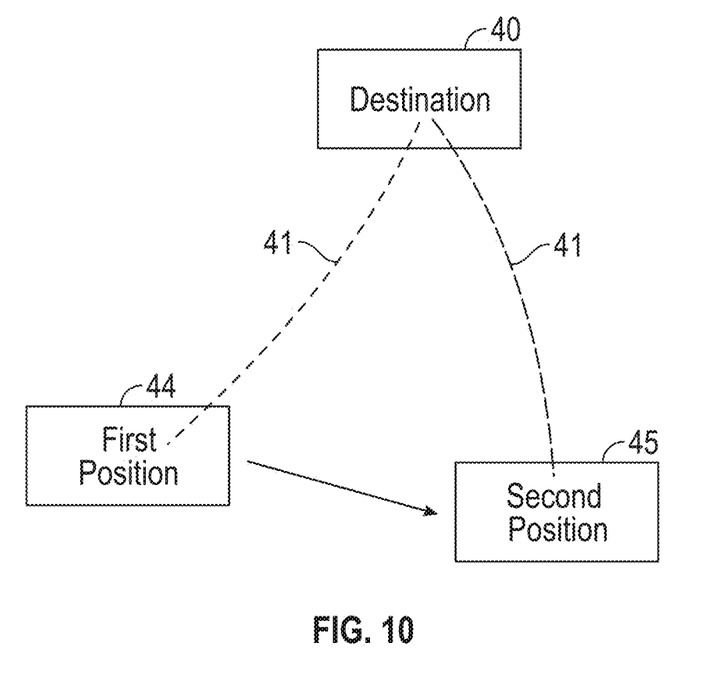
FIG. 10 schematically illustrates an embodiment for generating an adapted static navigation display that is based on a division of the augmentable area into subareas.

FIG. 10 schematically illustrates an approach for generating an adapted static navigation display. The augmentable area is divided into sections, or respectively subareas of a fixed size, so-called tiles. A navigation path 41 is displayed from the tile corresponding to the first position 44 of the user to the destination 40 that is statically and fixedly connected to the environment, i.e., the starting point and end point are fixed. If the user changes from the first position 44 to a second position 45 that corresponds to another tile, the current navigation path 41 is hidden which is indicated by the dashed line with the large dash spacing. This can be done without or with animation; for example, the current navigation path 41 may become increasingly transparent. While the navigation path starting from the old tile is hidden, the navigation path 41 for the new tile is calculated and inserted, which is indicated by the dashed line with the short dash spacing. In doing so, it is recommendable if no two equivalent paths are visible at the same time to prevent confusion. The old navigation path 41 first largely disappears before the new navigation path 41 is shown.

Figure 11:
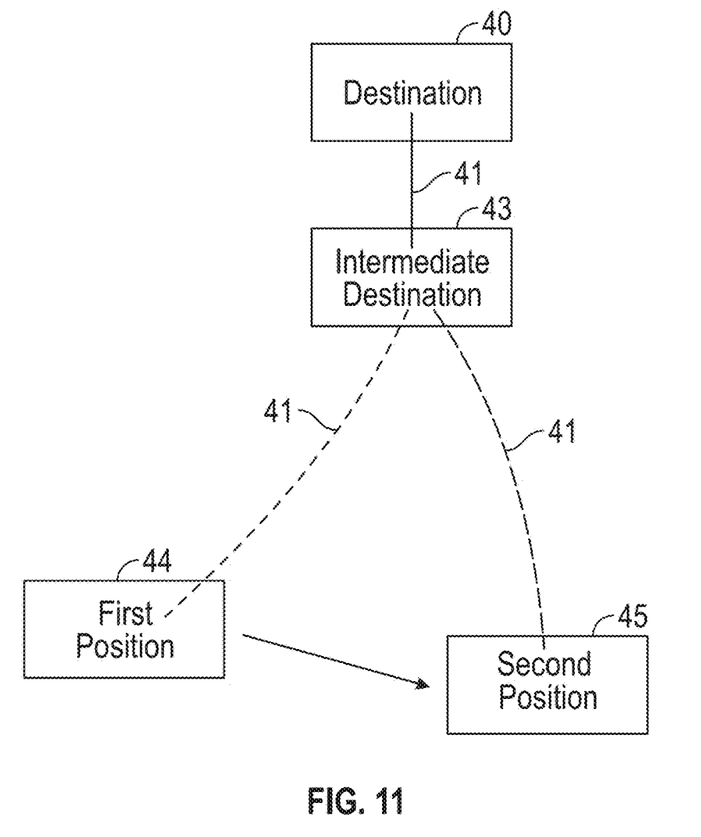
FIG. 11 schematically illustrates an expansion of the embodiment of FIG. 10 in which only a subsection of a navigation path is newly shown.

FIG. 11 schematically illustrates an expansion of the approach from FIG. 10. In this expansion, the entire old navigation path 41 is not replaced by a new navigation path 41; instead, an intermediate destination 43 is used. The subsection of the navigation path from the intermediate destination 43 to the destination is retained. Only the subsection of the navigation path 41 between the tile corresponding to the first position 44, 45 of the user to the intermediate destination 43 is newly shown.

Figure 12:
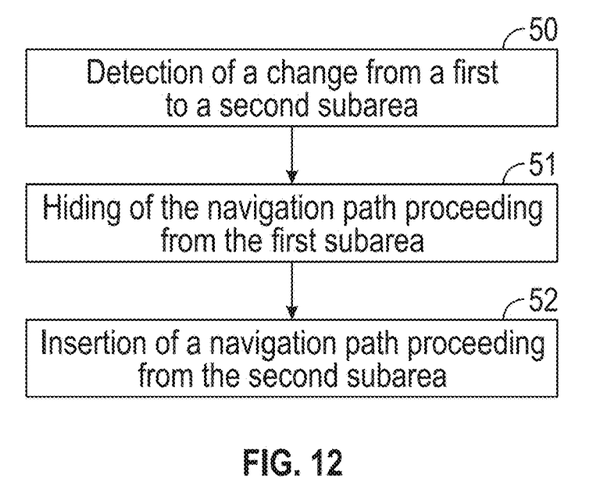
FIG. 12 schematically portrays an embodiment of a method for generating an adapted static navigation display.

FIG. 12 schematically portrays a method for generating an adapted static navigation display that is based on a division of the augmentable area into subareas. The static navigation display is a navigation path proceeding from a first subarea in the direction of the destination. It is then detected 50 that the user is switching from a first subarea to a second subarea. Then the navigation path proceeding from the first subarea is hidden 51. At the same time or afterward, a navigation path proceeding from the second subarea is inserted 52. In doing so, it can also be provided to only newly show a section of the navigation path up to an intermediate destination.

LIST OF REFERENCE NUMERALS

1 Augmented reality device
2 Camera
3 Interface
4 Pose-determining device
5 Graphics unit
6 Projection unit
10 Generation of a static navigation display
11 Detection of a situation that requires an adaptation of the display
12 Generation of an adapted static navigation display or a supplementary navigation display
20 Device
21 Input
22 Graphics generator
23 Sensor system
24 Control unit
25 Memory
26 Output 27 User interface
30 Device
31 Memory
32 Processor
33 Input
34 Output
40 Destination
41 Static navigation display
42 Supplementary navigation display
43 Intermediate destination
44 First position
45 Second position
50 Detection of a change from a first to a second subarea
51 Hiding of the navigation path proceeding from the first subarea
52 Insertion of a navigation path proceeding from the second subarea The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method of controlling a display of a mobile augmented reality device of a user for pedestrian navigation, comprising:
   generating a static navigation display for a destination, wherein an area that can be augmented by the mobile augmented reality device is divided into subareas and wherein the static navigation display is a navigation path proceeding from a first subarea in the direction of the destination;
   detecting that the user is switching from a first subarea to a second subarea;
   hiding the navigation path proceeding from the first subarea; and
   inserting a navigation path proceeding from the second subarea.

2. The method of claim 1, wherein detecting that the user is switching from a first subarea to a second subarea comprises user input, wherein the user input comprises a facial gesture of the user, a hand gesture of the user, or a voice command of the user.

3. The method of claim 1, comprising generating a supplementary navigation display, wherein the supplementary navigation display is a temporary navigation path toward the destination, a compass, or a directional arrow.

4. The method of claim 1, comprising generating a supplementary navigation display, wherein the supplementary navigation display is a visual signal with a directional characteristic.

5. The method of claim 1, wherein the navigation path is only hidden between the first subarea and an intermediate destination and is inserted between the second subarea and the intermediate destination.

6. A non-transitory computer-readable storage medium with instructions that, when executed by a computer, cause the computer to execute the method of claim 1 for controlling a display of a mobile augmented reality device of a user for pedestrian navigation.

7. A device for controlling a display of a mobile augmented reality device of a user for pedestrian navigation having:
   a graphics generator for the generation of a static navigation display for a destination that is fixedly positioned in a real environment, wherein an area that can be augmented is divided into subareas in the real environment and wherein the static navigation display comprises a navigation path proceeding from a first subarea in the direction of the destination; and
   a sensor system, configured for detecting a situation that requires an adaptation of the display of the mobile augmented reality device based on the user switching from a first subarea to a second subarea;
   wherein the graphics generator is configured to generate one or more of a static navigation display adapted to the situation and a supplementary navigation display, comprising hiding the navigation path proceeding from the first subarea and inserting a navigation path proceeding from the second subarea.

8. A mobile augmented reality device for pedestrian navigation, comprising a display and a device of claim 7.

9. The method of claim 2, comprising generating a supplementary navigation display, wherein the supplementary navigation display is a temporary navigation path toward the destination, a compass, or a directional arrow.

10. The method of claim 2, comprising generating a supplementary navigation display, wherein the supplementary navigation display is a visual signal with a directional characteristic.

11. A mobile augmented reality device, configured to execute the method of claim 1.

12. A method of controlling a display of a mobile augmented reality device of a user for pedestrian navigation, comprising:
    generating a static navigation display for a destination that is fixedly positioned in a real environment, wherein an area that can be augmented by the augmented reality device is divided into subareas in the real environment and wherein the static navigation display is a navigation path proceeding from a first subarea in the direction of the destination;
    detecting a situation that requires an adaptation of the display of the mobile augmented reality device based on the user switching from a first subarea to a second subarea; and
    generating one or more of a static navigation display adapted to the situation and a supplementary navigation display, comprising hiding the navigation path proceeding from the first subarea and inserting a navigation path proceeding from the second subarea.

13. The method of claim 12, wherein detecting the situation that requires the adaptation of the display comprises user input, wherein the user input comprises a facial gesture of the user, a hand gesture of the user, or a voice command of the user.

14. The method of claim 12, wherein the supplementary navigation display is a temporary navigation path toward the destination, a compass, or a directional arrow.

15. The method of claim 12, wherein the supplementary navigation display is a visual signal with a directional characteristic.

16. The method of claim 12, wherein the navigation path is only hidden between the first subarea and an intermediate destination and is inserted between the second subarea and the intermediate destination.

17. The method of claim 13, wherein the supplementary navigation display is a temporary navigation path toward the destination, a compass, or a directional arrow.

18. The method of claim 13, wherein the supplementary navigation display is a visual signal with a directional characteristic.

* * * * *